US012715271B2

(12) United States Patent
Miyairi et al.

(10) Patent No.: US 12,715,271 B2
(45) Date of Patent: Aug. 25, 2026

(54) VEHICLE COMPARTMENT PURIFICATION SYSTEM, METHOD FOR CONTROLLING VEHICLE COMPARTMENT PURIFICATION SYSTEM, PROGRAM AND STORAGE MEDIUM

(71) Applicant: NGK Insulators, Ltd., Nagoya-City (JP)

(72) Inventors: Yukio Miyairi, Nagoya-City (JP); Masaaki Masuda, Nagoya-City (JP); Takuya Nakashima, Nagoya-City (JP); Subaru Matsumoto, Tokyo (JP)

(73) Assignee: NGK INSULATORS, LTD., Nagoya-City (JP)

( * ) Notice: Subject to any disclaimer, the term of this patent is extended or adjusted under 35 U.S.C. 154(b) by 896 days.

(21) Appl. No.: 17/932,331

(22) Filed: Sep. 15, 2022

(65) Prior Publication Data

US 2023/0096396 A1 Mar. 30, 2023

(30) Foreign Application Priority Data

Sep. 24, 2021 (JP) ................................ 2021-156065

(51) Int. Cl.
*B60H 3/06* (2006.01)
*B01D 53/04* (2006.01)
(Continued)

(52) U.S. Cl.
CPC ....... *B60H 3/0633* (2013.01); *B01D 53/0438* (2013.01); *B01D 53/0454* (2013.01);
(Continued)

(58) Field of Classification Search
CPC .................................................. B60H 3/0633
See application file for complete search history.

(56) References Cited

U.S. PATENT DOCUMENTS 6,199,397 B1 3/2001 Khelifa et al.
2019/0160418 A1* 5/2019 Matsumoto .......... B01D 53/261
(Continued)

FOREIGN PATENT DOCUMENTS

JP S58-078817 A 5/1983
JP H09-159198 A 6/1997
(Continued)

OTHER PUBLICATIONS

English Translation of International Publication No. WO 2020/036067 A1 provided by the European Patent Office website espacenet.com: Miyairi, Yuko; Heating Element for Heating Passenger Compartment, Method of Use Thereof, and Heater for Heating Passenger Compartment; Feb. 20, 2020 (Year: 2020).*
(Continued)

*Primary Examiner* — Kevin Joyner
(74) *Attorney, Agent, or Firm* — Muncy, Geissler, Olds & Lowe, P.C.

(57) ABSTRACT

A vehicle compartment purification system configured to be capable of executing a regeneration mode of a functional material by a controller, the regeneration mode including a first regeneration step in which the air is flowed through a plurality of cells of a heater element at a flow velocity A for a predetermined time from a start of the regeneration mode, and after the first regeneration step, a second regeneration step in which the air is flowed through the plurality of cells at a flow velocity B and flowed out to the outflow piping; wherein the flow velocity A and the flow velocity B satisfy the flow velocity A<the flow velocity B, provided that a direction from a first end surface to a second end surface of the heater element is regarded as a positive direction, and the flow velocity B is a positive value.

15 Claims, 6 Drawing Sheets

(51) Int. Cl.

| | |
|---|---|
| ***B01D 53/86*** | (2006.01) |
| ***B01D 53/96*** | (2006.01) |
| ***B01J 38/02*** | (2006.01) |

(52) U.S. Cl.

CPC ..... *B01D 53/8668* (2013.01); *B01D 53/8671* (2013.01); *B01D 53/8696* (2013.01); *B01D 53/96* (2013.01); *B01J 38/02* (2013.01); *B01D 2253/3425* (2013.01); *B01D 2255/9155* (2013.01); *B01D 2257/504* (2013.01); *B01D 2257/708* (2013.01); *B01D 2257/80* (2013.01); *B01D 2257/90* (2013.01); *B01D 2259/40098* (2013.01); *B01D 2259/4566* (2013.01)

(56) References Cited

U.S. PATENT DOCUMENTS

| | | | |
|---|---|---|---|
| 2020/0223293 | A1 | 7/2020 | Matsumoto et al. |
| 2021/0041141 | A1 | 2/2021 | Miyairi et al. |

FOREIGN PATENT DOCUMENTS

| | | | |
|---|---|---|---|
| JP | 2000-107545 | A | 4/2000 |
| JP | 2000-127756 | A | 5/2000 |
| JP | 2000-325724 | A | 11/2000 |
| JP | 2016-135653 | A | 7/2016 |
| JP | 2020-104774 | A | 7/2020 |
| JP | 2020-111282 | A | 7/2020 |
| WO | 2020/036067 | A1 | 2/2020 |

OTHER PUBLICATIONS

Japanese Office Action (with English translation) dated Jun. 26, 2024 (Application No. 2021-156065).

* cited by examiner 100
30a
30b
11
10
14
12a
O
12b
13
20
30a
30b

VEHICLE COMPARTMENT PURIFICATION SYSTEM, METHOD FOR CONTROLLING VEHICLE COMPARTMENT PURIFICATION SYSTEM, PROGRAM AND STORAGE MEDIUM

CROSS REFERENCE TO RELATED APPLICATIONS

The present invention claims the benefit of priority to Japanese Patent Application No. 2021-156065 filed on Sep. 24, 2021 with the Japanese Patent Office, the entire contents of which are incorporated herein by reference in its entirety.

FIELD OF THE INVENTION

The present invention relates to a vehicle compartment purification system, a control method for a vehicle compartment purification system, a program, and a storage medium.

BACKGROUND OF THE INVENTION

In various vehicles such as automobiles, there is an increasing demand for improvement of vehicle compartment. Specific requirements include reducing $CO_2$ in the vehicle compartment to suppress driver drowsiness, controlling the humidity in the vehicle compartment, and removing harmful volatile components such as odor components and allergy-inducing components in the vehicle compartment, and the like. Ventilation can be mentioned as an effective measure to meet such demands, but ventilation causes a large loss of heater energy in winter and causes deterioration of energy efficiency in winter. In particular, in an electric vehicle (BEV: Battery Electric Vehicle), there is a problem that the cruising range is significantly reduced due to the energy loss.

As methods for solving the above problem, Patent Literature 1 and Patent Literature 2 discloses a vehicle compartment purification system which captures components to be removed such as water vapor and $CO_2$ in the air of a vehicle compartment with a functional material such as an adsorbent, and reacts or separates the components to be removed by heating to release them to the outside of the vehicle to regenerate the functional material. In such a vehicle compartment purification system, it is required that the air and the functional materials come into contact with each other as much as possible in order to secure the capture performance of the component to be removed, and that the functional material can be heated to a predetermined temperature in order to promote the regeneration of the functional material. Regeneration is accomplished, for example, by a method of removing the substance adsorbed on the functional material by an oxidation reaction, and a method of desorbing the substance adsorbed on the functional material to discharge the substance. However, in any case, it is necessary to heat the functional material to an appropriate temperature according to the adsorbed substance.

On the other hand, Patent Literature 3 discloses a heater element, comprising a pillar-shaped honeycomb structure portion having an outer peripheral side wall, and partition walls provided inside the outer peripheral side wall, the partition walls partitioning a plurality of cells forming flow paths from a first end surface to a second end surface, wherein the partition walls have PTC characteristics, an average thickness of the partition walls is 0.13 mm or less, and an open frontal area on the first and second end surfaces is 0.81 or more. This heater element is used for a heater for heating a vehicle compartment.

PRIOR ART

Patent Literature

[Patent Literature 1] Japanese Patent Application Publication No. 2020-104774

[Patent Literature 2] Japanese Patent Application Publication No. 2020-111282

[Patent Literature 3] WO 2020/036067

SUMMARY OF THE INVENTION

The heater element described in Patent Literature 3 is used for heating a vehicle compartment, and it is an efficient heating means because it has a honeycomb structure and can increase the heating area. Therefore, it is considered that the use of such a heater element as a carrier of the functional material can contribute to shortening the regeneration time of the functional material.

In particular, since the heater element described in Patent Literature 3 can be heated by energization and has PTC characteristics, it is considered the functional material can be easily heated, while excessive heat generation can be suppressed and thermal deterioration of the functional material can be suppressed. In addition, since the risk of excessive temperature is avoided, safety can be ensured even if the initial resistance is set low to increase the heating rate, and the temperature can be raised in a short time.

However, as a result of the study of the present inventors, when a functional material-containing layer is provided on the surface of the partition walls which partition the cells of the heater element described in Patent Literature 3, it is difficult for the temperature to rise near the inlet side of the heater element, thereby it is difficult for the functional material carried near the inlet side to rise in temperature. Therefore, the functional material carried near the inlet side has low regeneration efficiency and cannot be effectively used. Further, when the functional material is a catalyst, heating may be required to activate the catalyst, but if the temperature rise of the catalyst carried near the inlet side is insufficient, the catalyst cannot exert its function and effectively utilized. Providing a functional material-containing layer that cannot be effectively utilized is a factor that lowers the cost performance of the heater element.

The present invention has been created in view of the above circumstances, and in one embodiment, an object of the present invention is to provide a vehicle compartment purification system which is advantageous for enhancing the regeneration efficiency and/or exerting the function of functional material carried on a heater element. Further, in another embodiment, an object of the present invention is to provide a method for controlling such a vehicle compartment purification system. Further, in another embodiment, an object of the present invention is to provide a program for causing a computer to execute such method for controlling a vehicle compartment purification system, and a computer-readable storage medium storing the program that can be read by a computer.

According to one embodiment of the present invention, there is provided a vehicle compartment purification system, comprising:

a heater element comprising a honeycomb structure and a functional material-containing layer, wherein the honeycomb structure has an outer peripheral wall and partition walls provided inside the outer peripheral wall, the partition walls partitioning a plurality of cells that form flow paths extending from an first end surface to an second end surface, and at least the partition walls are made of a material having PTC characteristics, and the functional material-containing layer is provided on a surface of the partition walls;

a power supply for applying voltage to the heater element;

an inflow piping for sending air from the vehicle compartment to the plurality of cells of the heater element;

an outflow piping comprising a first path for returning the air flowing out of the plurality of cells of the heater element to the vehicle compartment, and a second path for discharging the air flowing out of the plurality of cells of the heater element to an outside of the vehicle;

a switching valve provided in the outflow piping and capable of switching the flow of the air flowing through the outflow piping between the first path and the second path;

a ventilator for sending the air from the vehicle compartment to the heater element via the inflow piping; and a controller capable of executing a regeneration mode in which a component to be removed captured by the functional material-containing layer is discharged to the outside of the vehicle by turning on an voltage applied from the power supply, and switching the switching valve such that the air flowing through the outflow piping passes through the second path;

wherein the regeneration mode comprises:

a first regeneration step in which the air is flowed through the plurality of cells at a flow velocity A for a predetermined time from a start of the regeneration mode, and after the first regeneration step, a second regeneration step in which the air from the inflow piping is flowed through the plurality of cells at a flow velocity B and flowed out to the outflow piping; and the vehicle compartment purification system is configured to be capable of executing the regeneration mode by the controller such that the flow velocity A and the flow velocity B satisfy the flow velocity A<the flow velocity B, provided that a direction from the first end surface to the second end surface is regarded as a positive direction, and the flow velocity B is a positive value.

According to another embodiment of the present invention, there is provided a method for controlling a vehicle compartment purification system, the vehicle compartment purification system comprising:

a heater element comprising a honeycomb structure and a functional material-containing layer, wherein the honeycomb structure has an outer peripheral wall and partition walls provided inside the outer peripheral wall, the partition walls partitioning a plurality of cells that form flow paths extending from an first end surface to an second end surface, and at least the partition walls are made of a material having PTC characteristics, and the functional material-containing layer is provided on a surface of the partition walls;

a power supply for applying voltage to the heater element;

an inflow piping for sending air from the vehicle compartment to the plurality of cells of the heater element;

an outflow piping comprising a first path for returning the air flowing out of the plurality of cells of the heater element to the vehicle compartment, and a second path for discharging the air flowing out of the plurality of cells of the heater element to an outside of the vehicle;

a switching valve provided in the outflow piping and capable of switching the flow of the air flowing through the outflow piping between the first path and the second path; and a ventilator for sending the air from the vehicle compartment to the heater element via the inflow piping;

wherein the method comprises a regeneration mode in which and a component to be removed captured by the functional material-containing layer is discharged to the outside of the vehicle by turning on an voltage applied from the power supply, and switching the switching valve such that the air flowing through the outflow piping passes through the second path;

the regeneration mode comprises:

a first regeneration step in which the air is flowed through the plurality of cells at a flow velocity A for a predetermined time from a start of the regeneration mode, and after the first regeneration step, a second regeneration step in which the air from the inflow piping is flowed through the plurality of cells at a flow velocity B and flowed out to the outflow piping; and the method comprises controlling the vehicle compartment purification system such that the flow velocity A and the flow velocity B satisfy the flow velocity A<the flow velocity B, provided that a direction from the first end surface to the second end surface is regarded as a positive direction, and the flow velocity B is a positive value.

According to yet another embodiment of the present invention, there is provided a program for causing a computer to execute the method for controlling a vehicle compartment purification system according to the embodiment of the present invention.

According to yet another embodiment of the present invention, there is provided a computer-readable storage medium storing a program for causing a computer to execute the method for controlling a vehicle compartment purification system according to an embodiment of the present invention.

By using the vehicle compartment purification system according to an embodiment of the present invention, it is possible to enhance the regeneration efficiency and/or to exert the function of the functional material carried on the heater element. Therefore, it becomes possible to more effectively utilize the functional material carried on the heater element.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

(1. Heater Element with Functional Material-Containing Layer)

The heater element with a functional material-containing layer (hereinafter, abbreviated as "heater element") according to an embodiment of the present invention can be suitably used as a heater element used in a vehicle compartment purification system in various vehicles such as automobiles. Vehicles are not particularly limited, and examples thereof include automobiles and electric trains. Examples of automobiles include, but are not limited to, gasoline-powered vehicles, diesel-powered vehicles, gas-fueled vehicles using CNG (Compressed Natural Gas), LNG (Liquefied Natural Gas), fuel cell vehicles, electric vehicles, and plug-in hybrid vehicles. The heater element according to the embodiment of the present invention can be particularly suitably used for vehicles having no internal combustion engine such as an electric vehicle and an electric train.

Figure 1:
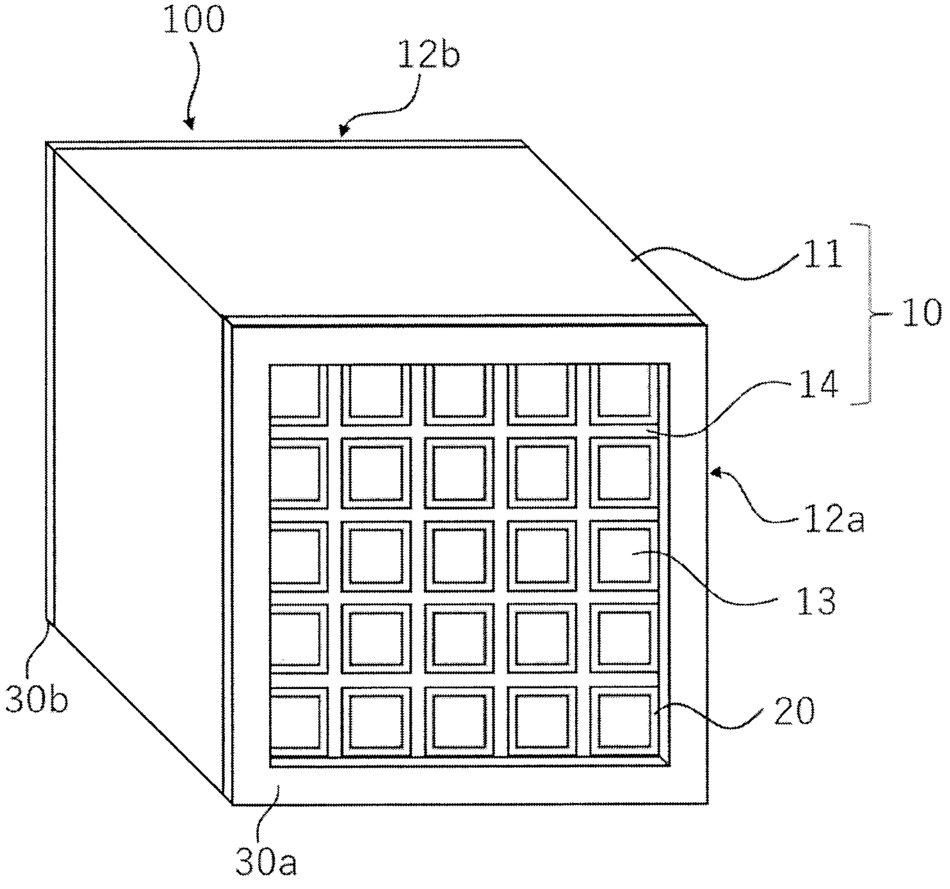
FIG. 1 is a schematic perspective view of a heater element according to an embodiment of the present invention.

As shown in FIGS. 1 an 2, the heater element 100 comprises a honeycomb structure 10 and a functional material-containing layer 20, wherein the honeycomb structure 10 has an outer peripheral wall 11 and partition walls 14 provided inside the outer peripheral wall 11, the partition walls 14 partitioning a plurality of cells 13 that form flow paths extending from an first end surface 12*a* to an second end surface 12*b*, and the functional material-containing layer 20 is provided on a surface of the partition walls 14. Further, the heater element 100 can further comprise a pair of electrodes 30*a* and 30*b* provided on the first end surface 12*a* and the second end surface 12*b* of the honeycomb structure 10. Note that, in the present specification, the components composed of the honeycomb structure 10 excluding the functional material-containing layer from the heater element 100 and the pair of electrodes 30*a* and 30*b* is referred to as a "honeycomb heater device".

Hereinafter, each component of the heater element 100 will be described in detail.

(1-1 Honeycomb Structure)

The shape of the honeycomb structure 10 is not particularly limited. For example, the outer shape of the cross-section orthogonal to the flow path direction (direction in which the cells 13 extend) of the honeycomb structure 10 can be polygonal (quadrangle (rectangle, square), pentagon, hexagon, heptagon, octagon, and the like), circular, oval (egg-shape, ellipse, oval, rounded rectangle, and the like). In addition, the end surfaces (first end surface 12*a* and second end surface 12*b*) have the same shape as the cross-section. When the cross-section and the end surfaces are polygonal, the corners may be chamfered.

Figures 2, 3:
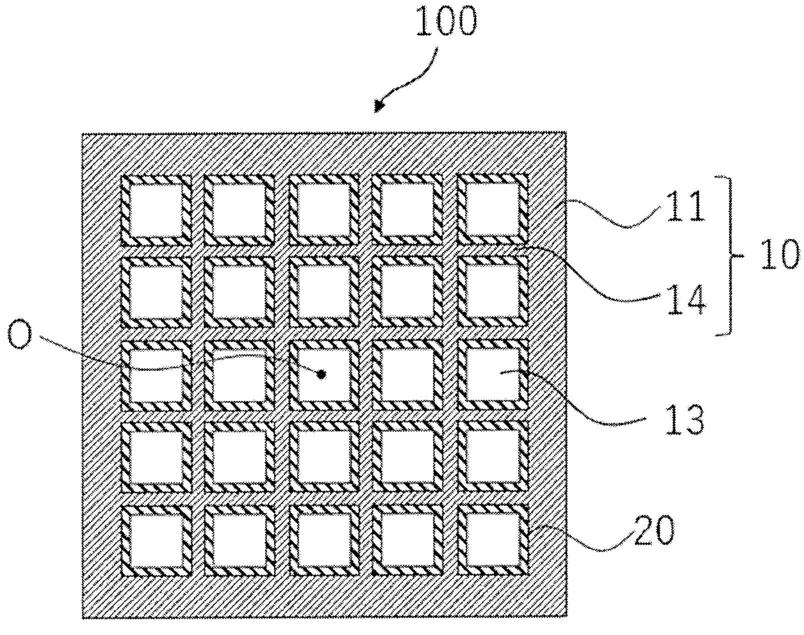
FIG. 2 is a schematic cross-sectional view orthogonal to the flow path direction of a heater element according to an embodiment of the present invention.
FIG. 3 is a schematic cross-sectional view parallel to the flow path direction of a heater element according to an embodiment of the present invention.

The shape of the cells 13 is not particularly limited, and in the cross-section of the honeycomb structure 10 orthogonal to the flow path direction, it can be polygonal (quadrangle, pentagon, hexagon, heptagon, octagon, and the like), circular, or oval. The shapes may be uniform or may be a combination of two or more. Further, among these shapes, a quadrangle or a hexagon is preferable. By providing the cells 13 having such a shape, it is possible to reduce the pressure loss when the air flows. Note that, FIGS. 1 and 2 show, as an example, a honeycomb structure 10 in which the outer shape of the cross-section and the shape of the cells 13 are quadrangular in the cross-section orthogonal to the flow path direction.

The honeycomb structure 10 may be a honeycomb joint body having a plurality of honeycomb segments and a joining layer for joining the outer peripheral side surfaces of the plurality of honeycomb segments. By using the honeycomb joint body, it is possible to increase the total cross-sectional area of the cells 13, which is important for securing the air flow rate, while suppressing the occurrence of cracks.

In addition, the joining layer can be formed by using a joining material. The joining material is not particularly limited, but a ceramic material to which a solvent such as water is added to form a paste can be used. The joining material may contain a material having PTC (Positive Temperature Coefficient) characteristics, or may contain the same material as the outer peripheral wall 11 and the partition walls 14. In addition to the role of joining the honeycomb segments to each other, the joining material can also be used as an outer peripheral coating material after joining the honeycomb segments.

From the viewpoints of ensuring the strength of the honeycomb structure 10, reducing the pressure loss when the air passes through the cells 13, securing the amount of the functional material carried, and securing the contact area with the air flowing in the cells 13, and the like, it is desirable to combine the thickness of the partition walls 14, the cell density, and the cell pitch (or the open frontal area of the cells) appropriately.

In the present specification, the thickness of the partition wall 14 refers to a crossing length of a line segment that crosses the partition wall 14 when the centers of gravity of adjacent cells 13 are connected by this line segment in a cross-section orthogonal to the flow path direction of the honeycomb structure 10. The thickness of the partition walls 14 refers to the average value of the thicknesses of all the partition walls 14.

In the present specification, the cell density is a value obtained by dividing the number of cells by the area of one end surface of the honeycomb structure 10 (the total area of the partition walls 14 and the cells 13 excluding the outer peripheral wall 11).

In the present specification, the cell pitch refers to a value obtained by the following calculation. First, the area per cell is calculated by dividing the area of one end surface of the honeycomb structure 10 (the total area of the partition wall 14 and the cells 13, excluding the outer peripheral wall 11) by the number of cells. Next, the square root of the area per cell is calculated, and this is deemed as the cell pitch.

In the present specification, the open frontal area of the cells is a value obtained by dividing the total area of the cells 13 partitioned by the partition walls in a cross-section orthogonal to the flow path direction of the honeycomb structure 10 by the area of one end surface (the total area of the partition walls 14 and the cells 13, excluding the outer peripheral wall 11). Note that, in calculating the open frontal area of the cells, the functional material-containing layer 20 is not taken into consideration.

In an embodiment advantageous from the viewpoint of carrying a sufficient amount of functional material, the thickness of the partition walls is 0.125 mm or less, the cell density is 100 cells/$cm^2$ or less, and the cell pitch is 1.0 mm or more. In a preferred embodiment, the thickness of the partition walls is 0.100 mm or less, the cell density is 70 cells/$cm^2$ or less, and the cell pitch is 1.2 mm or more. In a more preferable embodiment, the thickness of the partition walls is 0.080 mm or less, the cell density is 65 cells/$cm^2$ or less, and the cell pitch is 1.3 mm or more.

In each of the above embodiments, from the viewpoint of ensuring the strength of the honeycomb structure and keeping the electrical resistance low, the lower limit of the thickness of the partition walls is preferably 0.010 mm or more, more preferably 0.020 mm or more, and even more preferably 0.030 mm or more.

In each of the above embodiments, from the viewpoint of ensuring the strength of the honeycomb structure, keeping the electric resistance low, and increasing the surface area to promote the reaction, adsorption and desorption, the lower limit of the cell density is preferably 30 cells/$cm^2$ or more, more preferably 35 cells/$cm^2$ or more, and even more preferably 40 cells/$cm^2$ or more.

In each of the above embodiments, from the viewpoint of ensuring the strength of the honeycomb structure, keeping the electric resistance low, and increasing the surface area to promote the reaction, adsorption, and desorption, the upper limit of the cell pitch is preferably 2.0 mm or less, more preferably 1.8 mm or less, and even more preferably 1.6 mm or less.

In an embodiment advantageous from the viewpoint of reducing pressure loss and maintaining strength, the thickness of the partition walls is 0.08 mm or more and 0.36 mm or less, and the cell density is 2.54 cells/$cm^2$ or more and 140 cells/$cm^2$ or less, and the open frontal area of the cells is 0.80 or more. In a preferred embodiment, the thickness of the partition walls is 0.09 mm or more and 0.35 mm or less, the cell density is 15 cells/$cm^2$ or more and 100 cells/$cm^2$ or less, and the open frontal area of the cells is 0.83 or more. In a more preferable embodiment, the thickness of the partition walls is 0.14 mm or more and 0.30 mm or less, the cell density is 20 cells/$cm^2$ or more and 90 cells/$cm^2$ or less, and the open frontal area of the cells is 0.85 or more.

In each of the above embodiments, from the viewpoint of ensuring the strength of the honeycomb structure, the upper limit of the open frontal area of the cells is preferably 0.94 or less, more preferably 0.92 or less, and even more preferably 0.90 or less.

The thickness of the outer peripheral wall 11 is not particularly limited, but is preferably determined based on the following viewpoints. First, from the viewpoint of reinforcing the honeycomb structure 10, the thickness of the outer peripheral wall 11 is preferably 0.05 mm or more, more preferably 0.06 mm or more, even more preferably 0.08 mm or more. On the other hand, from the viewpoint of increasing the electrical resistance to suppress the initial current and reducing the pressure loss when the air flows, the thickness of the outer peripheral wall 11 is preferably 1.0 mm or less, more preferably 0.5 mm or less, even more preferably 0.4 mm or less, even more preferably 0.3 mm or less.

In the present specification, the thickness of the outer peripheral wall 11 refers to a length in the normal direction of a side surface from the boundary between the outer peripheral wall 11 and the cell 13 or partition wall 14 on the outermost side to the side surface of the honeycomb structure 10, in a cross-section orthogonal to the flow path direction of the honeycomb structure 10.

The length of the honeycomb structure 10 in the flow path direction and the cross-sectional area orthogonal to the flow path direction may be adjusted according to the required size of the heater element 100, and are not particularly limited. For example, when used for a heater element 100 which is compact while ensuring a predetermined function, the honeycomb structure 10 may have a length of 2 to 20 mm in the flow path direction and a cross-sectional area orthogonal to the flow path direction of 10 $cm^2$ or more. The upper limit of the cross-sectional area orthogonal to the flow path direction is not particularly limited, but is, for example, 300 $cm^2$ or less.

The partition walls 14 constituting the honeycomb structure 10 is made of a material capable of generating heat by energization, and specifically, is made of a material having PTC characteristics. If necessary, the outer peripheral wall 11 may also be made of a material having PTC characteristics similar to the partition walls 14.

It is possible to heat the functional material-containing layer 20 by heat transfer from the heated partition wall 14 (and the outer peripheral wall 11 if necessary). Further, the material having PTC characteristics has a characteristic that when the temperature rises and exceeds a Curie point, the resistance value rapidly rises and it becomes difficult for electricity to flow. Therefore, when the heater element 100 becomes hot, the electric current flowing through the partition wall 14 (and the outer peripheral wall 11 if necessary) is limited, so that excessive heat generation of the heater element 100 is suppressed. Therefore, it is also possible to suppress thermal deterioration of the functional material-containing layer 20 due to excessive heat generation.

The lower limit of the volume resistivity of the material having PTC characteristics at 25° C. is preferably 0.5 Ω·cm or more, more preferably 1 Ω·cm or more, and even more preferably 5 Ω·cm or more, from the viewpoint of obtaining appropriate heat generation. The upper limit of the volume resistivity of the material having PTC characteristics at 25° C. is preferably 20 Ω·cm or less, more preferably 18 Ω·cm or less, and even more preferably 16 Ω·cm or less, from the viewpoint of generating heat at a low drive voltage. In the present specification, the volume resistivity of a material having PTC characteristics at 25° C. is measured according to JIS K6271: 2008.

From the viewpoint of being able to generate heat when energized and having PTC characteristics, the outer peripheral wall 11 and the partition walls 14 are preferably made of a material containing barium titanate ($BaTiO_3$) as a main component, and more preferably ceramics made of a material containing barium titanate ($BaTiO_3$) based crystal particles in which a part of Ba is replaced with a rare earth element as a main component. Note that, in this specification, a "main component" means the component accounts for more than 50% by mass in the whole components. The content of $BaTiO_3$-based crystal particles can be determined by, for example, fluorescent X-ray analysis. The content of other crystal particles can be determined in the same manner as this method.

The composition formula of the $BaTiO_3$-based crystal particles in which a part of Ba is replaced with a rare earth element can be expressed by $(Ba_{1-x}A_x)$ $TiO_3$. In the composition formula, A represents one or more rare earth elements, and 0.0001≤x≤0.010.

A is not particularly limited as long as it is a rare earth element, but is preferably one or more selected from the group consisting of La, Ce, Pr, Nd, Eu, Gd, Dy, Ho, Er, Y and Yb, and it is more preferably La. x is preferably 0.001 or more, more preferably 0.0015 or more, from the viewpoint of suppressing the electric resistance from becoming too high at room temperature. On the other hand, x is preferably 0.009 or less from the viewpoint of suppressing insufficient sintering that will cause excessively high electrical resistance at room temperature.

The content of $BaTiO_3$-based crystal particles in which a part of Ba is replaced with a rare earth element is not particularly limited as long as it is the main component of the ceramics, but is preferably 90% by mass or more, more preferably 92% by mass or more, and even more preferably 94% by mass or more in the ceramics. In addition, the upper limit of the content of the $BaTiO_3$-based crystal particles is not particularly limited, but is generally 99% by mass, preferably 98% by mass.

The content of the $BaTiO_3$-based crystal particles can be determined by, for example, fluorescent X-ray analysis. The content of other crystal particles can be determined in the same manner as this method.

It is desirable that the materials used for the outer peripheral wall 11 and the partition walls 14 substantially contain no lead (Pb) from the viewpoint of reducing the environmental burden. Specifically, the outer peripheral wall 11 and the partition walls 14 preferably have a Pb content of 0.01% by mass or less, more preferably 0.001% by mass or less, and even more preferably 0% by mass. Due to the low Pb content, for example, the air heated by contacting the partition walls 14 generating heat can be safely applied to organisms such as humans. In the outer peripheral wall 11 and the partition walls 14, the Pb content is preferably less than 0.03% by mass, more preferably less than 0.01% by mass, and even more preferably 0% by mass, in terms of PbO. The lead content can be determined by ICP-MS (Inductively Coupled Plasma Mass Spectrometry).

The lower limit of the Curie point of the material constituting the outer peripheral wall 11 and the partition walls 14 is preferably 100° C. or higher, more preferably 110° C. or higher, and more preferably 125° C. or higher, from the viewpoint of efficiently heating the air. In addition, regarding the upper limit of the Curie point, from the viewpoint of safety of a part placed in or near the vehicle compartment, it is preferably 250° C. or lower, more preferably 225° C. or lower, even more preferably 200° C. or lower, and even more preferably 150° C. or lower.

The Curie point of the material constituting the outer peripheral wall 11 and the partition walls 14 can be adjusted by the type and addition amount of a shifter. For example, the Curie point of barium titanate ($BaTiO_3$) is about 120° C., but the Curie point can be shifted to the low temperature side by replacing a part of Ba and Ti with one or more of Sr, Sn and Zr.

In the present invention, the Curie point is measured by the following method. Attach the sample to a sample holder for measurement, mount it in a measuring tank (for example, MINI-SUBZERO MC-810P manufactured by ESPEC CORP.), and measure the change in the electrical resistance of the sample when the temperature is raised from 10° C. with a DC resistance meter (for example, Multimeter 3478A manufactured by YOKOGAWA HEWLETT PACKARD LTD). From the electric resistance-temperature plot obtained by the measurement, the temperature at which the resistance value becomes twice the resistance value at room temperature (20° C.) is defined as the Curie point.

(1-2 Functional Material-Containing Layer)

The functional material-containing layer 20 is provided on the surface of the partition walls 14 of the honeycomb structure 10. Specifically, the functional material-containing layer 20 is provided on the surface of the partition walls 14 facing the cells 13 of the honeycomb structure 10, that is, on the inner walls of the cells 13. The functional material-containing layer 20 can also be provided on the outer peripheral wall 11 facing the cells 13.

The functional material contained in the functional material-containing layer 20 is not particularly limited as long as it is a material capable of exhibiting a desired function, but an adsorbent, a catalyst, or the like can be used. The adsorbent preferably has a function of adsorbing one or more kinds selected from components to be removed in the air, for example, water vapor, carbon dioxide, and an odor component. In addition, it is also preferable to have a function of adsorbing harmful volatile components. Further, by using a catalyst, the component to be removed can be purified. Further, an adsorbent and a catalyst may be used in combination for the purpose of enhancing the function of capturing the component to be removed by the adsorbent.

The adsorbent preferably has a function such that it is possible to adsorb components to be removed, such as water vapor, carbon dioxide, and harmful volatile components (for example, aldehydes, odor components, and the like) at −20 to 40° C., and release them at a high temperature of 60° C. or higher. Examples of the adsorbent having such a function include zeolite, silica gel, activated carbon, alumina, silica, low crystalline clay, and amorphous aluminum silicate complex, and the like. The type of the adsorbent may be appropriately selected according to the type of the component to be removed. For the adsorbent, one type may be used alone, or two or more types may be used in combination.

The catalyst preferably has a function capable of promoting a redox reaction. Examples of the catalyst having such a function include metal catalysts such as Pt, Pd and Ag, and oxide catalysts such as $CeO_2$ and $ZrO_2$. One type of catalyst may be used alone, or two or more types may be used in combination.

Harmful volatile components contained in the air of the vehicle compartment are, for example, volatile organic compounds (VOCs) and odor components. Specific examples of harmful volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, di-2-ethylhexyl phthalate, diazinon, acetaldehyde, 2-(1-methylpropyl) phenyl N-methylcarbamate, and the like.

The average thickness of the functional material-containing layer 20 may be determined according to the size of the cells 13, and is not particularly limited. For example, the average thickness of the functional material-containing layer 20 is preferably 20 μm or more, more preferably 25 μm or more, and even more preferably 30 μm or more, from the viewpoint of sufficiently ensuring contact with the air. On the other hand, from the viewpoint of suppressing the peeling of the functional material-containing layer 20 from the partition walls 14 and the outer peripheral wall 11, the average thickness of the functional material-containing layer 20 is preferably 400 μm or less, more preferably 380 μm or less, and even more preferably 350 μm or less.

The average thickness of the functional material-containing layer 20 is measured by the following procedure. As exemplified in FIG. 3, an arbitrary cross-section that is parallel to the flow path direction and passes through a central axis O extending in the flow path direction of the honeycomb structure 10 is cut out, and a cross-sectional image of magnification of about 50 times is obtained with a scanning electron microscope or the like. The position of the central axis O is the position of the center of gravity in the cross-section orthogonal to the flow path direction of the honeycomb structure 10 (see FIG. 2). For each functional material-containing layer 20 visually recognized from the cross-sectional image, the average thickness is calculated by dividing the cross-sectional area by the length of the cells 13 in the flow path direction. This calculation is performed for all the functional material-containing layers visually recognized from the cross-sectional image, and the overall average value is taken as the average thickness of the functional material-containing layer 20.

From the viewpoint that the functional material exerts a desired function in the heater element 100, the amount of the functional material-containing layer 20 is preferably 50 g/L or more and 500 g/L or less, more preferably 100 g/L or more and 400 g/L or less, and even more preferably 150 g/L or more and 350 g/L or less, with respect to the volume of the honeycomb structure 10. Note that, the volume of the honeycomb structure 10 is a value determined by the external dimensions of the honeycomb structure 10.

(1-3. Electrodes)

The heater element 100 according to one embodiment of the present invention can comprise a pair of electrodes 30*a* and 30*b* provided on the first end surface 12*a* and the second end surface 12*b* of the honeycomb structure 10. The heater element 100 of the embodiment shown in FIG. 1 comprises a pair of electrodes 30*a* and 30*b* on the surface of the outer peripheral wall 11 on the first end surface 12*a* and the second end surface 12*b* of the honeycomb structure 10. The pair of electrodes 30*a* and 30*b* may be provided on the surface of the partition walls 14 that forms the first end surface 12*a* (the second end surface 12*b*) instead of, or in addition to the surface of the outer peripheral wall 11 that forms the inlet end surface 12*a* (outlet end surface 12*b*). Further, they may be additionally provided on the surface of the partition walls 14 that form the inner wall of the cells 13. It is preferable that all the portions constituting each electrode be connected to each other.

Alternatively, the pair of electrodes 30*a* and 30*b* can be provided on the outer peripheral side surfaces facing each other with the central axis O extending in the flow path direction of the honeycomb structure 10 interposed therebetween.

By applying a voltage between the pair of electrodes 30*a* and 30*b*, the honeycomb structure 10 can generate heat by Joule heat. The pair of electrodes 30*a* and 30*b* may have an extended portion extending outward of the honeycomb structure 10. By providing the extended portion, it becomes easy to connect to connectors which are responsible for the connection with the external equipment.

The electrodes 30*a* and 30*b* are not particularly limited, and for example, a metal or alloy containing at least one selected from Cu, Ag, Al, Ni and Si can be used. It is also possible to use an ohmic electrode capable of ohmic contact with the outer peripheral wall 11 and/or the partition walls 14 having PTC characteristics. As the ohmic electrode, for example, an ohmic electrode containing at least one selected from Au, Ag and In as a base metal and at least one selected from Ni, Si, Ge, Sn, Se and Te for n-type semiconductors as a dopant can be used. Further, the electrodes 30*a* and 30*b* may have a one-layer structure or a laminated structure with two or more layers. When the electrodes 30*a* and 30*b* have a laminated structure of two or more layers, the materials of the respective layers may be the same type or different types.

The thicknesses of the electrodes 30*a* and 30*b* are not particularly limited and can be appropriately set according to the method of forming the electrodes 30*a* and 30*b*. Examples of the method for forming the electrodes 30*a* and 30*b* include metal deposition methods such as sputtering, vapor deposition, electrolytic deposition, and chemical deposition. Further, the electrodes 30*a* and 30*b* can also be formed by a method of applying an electrode paste and then baking or formed by thermal spraying. Further, the electrodes 30*a* and 30*b* may be formed by bonding a metal plate or an alloy plate.

The thickness of the electrodes 30*a* and 30*b* is preferably about 5 to 30 μm in the case of baking an electrode paste, about 100 to 1000 nm in the case of dry plating such as sputtering and vapor deposition, about 10 to 100 μm the case of thermal spraying, and about 5 to 30 μm the case of wet plating such as electrolytic deposition and chemical deposition. Further, when bonding a metal plate or an alloy plate, the thickness of the electrodes 30*a* and 30*b* is preferably about 5 to 100 μm.

(2. Method for Manufacturing Heater Element with Functional Material-Containing Layer)

Next, a method for manufacturing a heater element with a functional material-containing layer according to the present invention will be described for illustration. First, a raw material composition containing a dispersion medium and a binder is mixed with a ceramic raw material and kneaded to prepare a green body, and then the green body is extruded to prepare a honeycomb formed body. Additives such as a dispersant, a semiconductor-forming agent, a shifter, a metal oxide, a property improving agent, and a conductor powder can be added to the raw material composition, if necessary. In extrusion molding, a die having a desired overall shape, cell shape, partition wall thickness, cell density and the like can be used.

The ceramic raw material is a raw material for a portion that remains after firing and constitutes the skeleton of the honeycomb structure as ceramics. The ceramic raw material can be provided, for example, in the form of powder. As the ceramic raw material, oxides and carbonate raw materials such as $TiO_2$ and $BaCO_3$, which can be the main components of barium titanate, can be used. Further, semiconductor-forming agents such as Y, La, Ce, Pr, Nd, Sm, Eu, Gd, Tb, Dy, Ho, Er, Tm, Yb and Lu, low temperature side shifters such as Sr, Sn and Zr, high temperature side shifters such as (Bi—Na), (Bi—K), property improving agents such as Mn, and oxides, carbonates, or oxalates that become oxides after firing may be used. Conductor powders such as carbon black and nickel may be added to control conductivity.

Examples of the dispersion medium include water or a mixed solvent of water and an organic solvent such as alcohol, and water can be particularly preferably used.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose and hydroxypropoxyl cellulose in combination. Further, the binder content is preferably 4 parts by mass or more, more preferably 5 parts by mass or more, and 6 parts by mass or more, with respect to 100 parts by mass of the ceramic raw material, from the viewpoint of increasing the strength of the honeycomb formed body. The binder content is preferably 9 parts by mass or less, more preferably 8 parts by mass or less, and even more preferably 7 parts by mass or less, with respect to 100 parts by mass of the ceramic raw material, from the viewpoint of suppressing the occurrence of cracking due to abnormal heat generation in the firing step. For the binder, one type may be used alone, or two or more types may be used in combination.

As the dispersant, a surfactant such as ethylene glycol, dextrin, fatty acid soap, and polyalcohol can be used. For the dispersant, one type may be used alone, or two or more types may be used in combination. The content of the dispersant is preferably 0 to 2 parts by mass with respect to 100 parts by mass of the ceramic raw material.

Next, the obtained honeycomb formed body is dried. In the drying step, conventionally known drying methods such as hot wind drying, microwave drying, dielectric drying, reduced pressure drying, vacuum drying and freeze drying can be used. Among them, a drying method that combines hot wind drying with microwave drying or dielectric drying is preferable because the entire formed body can be dried quickly and uniformly.

Then, the dried honeycomb formed body can be fired to manufacture a honeycomb structure. It is also possible to perform a degreasing step for removing the binder before firing. The firing conditions can be appropriately determined depending on the material of the honeycomb formed body. For example, when the material of the honeycomb formed body contains barium titanate as a main component, the firing temperature is preferably 1100 to 1400° C., and more preferably 1200 to 1300° C. The firing time is preferably about 1 to 4 hours.

The atmosphere for carrying out the degreasing step may be, for example, an air atmosphere, an inert atmosphere, or a reduced pressure atmosphere. Among these, it is preferable to use an inert atmosphere in combination with a reduced pressure atmosphere that prevent insufficient firing due to the oxidation of the raw material and easily reduce the oxide contained in the raw material.

The furnace for firing is not particularly limited, and an electric furnace, a gas furnace or the like can be used.

A pair of electrodes can be bonded to the honeycomb structure obtained in this manner. The electrodes can be formed on the first end surface and the second end surface of the honeycomb structure, by metal deposition methods such as sputtering, vapor deposition, electrolytic deposition, and chemical deposition. Further, the electrodes can also be formed by applying an electrode paste on the first end surface and the second end surface of the honeycomb structure, and then by baking. Further, they can be formed by thermal spraying. The electrodes may be composed of a single layer, but it may be composed of a plurality of electrode layers having different compositions. When the electrodes are formed on the end surfaces by the above method, the cells can be prevented from being blocked by setting the thickness of the electrode layers so as not to be excessively large. For example, the thickness of the electrodes is preferably about 5 to 30 μm in the case of baking a paste, about 100 to 1000 nm in the case of dry plating such as sputtering and vapor deposition, about 10 to 100 μm in the case of thermal spraying, and about 5 to 30 μm in the case of wet plating such as electrolytic deposition and chemical deposition.

Next, by forming the functional material-containing layer 20 on the partition walls 14 of the honeycomb heater device thus obtained, a heater element with a functional material-containing layer can be obtained.

The method for forming the functional material-containing layer 20 is not particularly limited, and can be formed by, for example, the following steps. The honeycomb heater device is immersed in a slurry containing a functional material, an organic binder and water for a predetermined time, and the excessive slurry on the end surfaces and the outer periphery of the honeycomb structure 10 is removed by blowing and wiping. Then, a functional material-containing layer 20 can be formed on the partition walls 14 by drying the slurry. Drying can be performed while heating the honeycomb heater device to a temperature of, for example, about 120 to 600° C. The series of steps of immersion, slurry removal, and drying may be performed only once, but by repeating the steps a plurality of times, a functional material-containing layer 20 having a desired thickness can be provided on the partition walls 14.

(3. Vehicle Compartment Purification System and Method for Controlling the Same)

According to one embodiment of the present invention, there is provided a vehicle compartment purification system comprising the above-mentioned heater element with a functional material-containing layer. Further, according to one embodiment of the present invention, there is provided a control method for controlling the vehicle compartment purification system comprising the above-mentioned heater element with a functional material-containing layer. The vehicle compartment purification system can be suitably used for various vehicles such as automobiles.

Figure 4:
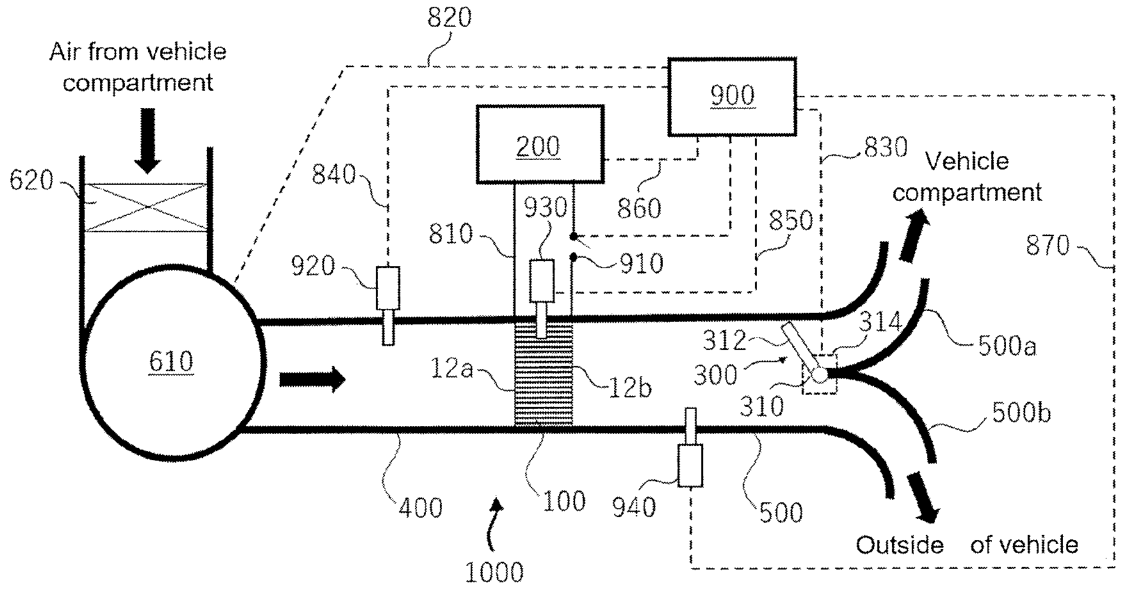
FIG. 4 is a schematic diagram showing a configuration of a vehicle compartment purification system according to an embodiment of the present invention.

FIG. 4 is a schematic diagram showing the configuration of the vehicle compartment purification system according to the embodiment of the present invention.

The vehicle compartment purification system 1000 comprises:

- a power supply 200 such as a battery for applying voltage to the heater element 100;
- an inflow piping 400 for sending the air from the vehicle compartment to the plurality of cells 13 of the heater element 100;
- an outflow piping 500 comprising a first path 500*a* for returning the air flowing out of the plurality of cells 13 of the heater element 100 to the vehicle compartment, and a second path 500*b* for discharging the air flowing out of the plurality of cells 13 of the heater element 500*b* to an outside of the vehicle;
- a switching valve 300 provided in the outflow piping 500 and capable of switching the flow of the air flowing through the outflow piping 500 between the first path 500*a* and the second path 500*b;*
- a ventilator 610 for sending the air from the vehicle compartment to the heater element 100 via the inflow piping 400; and
- a controller 900 capable of executing a purification mode and a regeneration mode.

Figure 6:
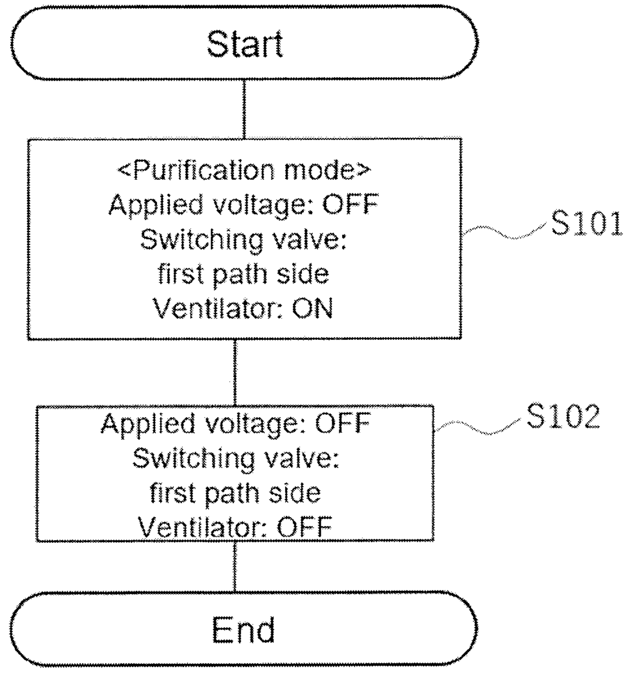
FIG. 6 is an example of a flowchart when a controller 900 executes a purification mode.

FIG. 6 shows an example of a flowchart when the controller 900 executes the purification mode. For example, when the controller 900 receives a purification mode start command triggered by a concentration sensor signal (humidity sensor signal for water vapor, and the like) of a component to be removed from a concentration sensor (not shown) installed in the vehicle compartment, the controller 900 turns off the voltage applied from the power supply 200 to the heater element 100, switches the switching valve 300 such that the air flowing through the outflow piping 500 passes through the first path 500*a*, and turns on the ventilator 610 (S101). As a result, the purification mode is started, and the component to be removed contained in the air from the vehicle compartment is captured by the functional material-containing layer 20 carried on the heater element 100, and the vehicle compartment air is purified.

Specifically, the air from the vehicle compartment passes through the inflow piping 400 and flows in from the first end surface 12*a* (or the second end surface 12*b*) of the heater element 100, passing through the inside of the heater element 100. Then, it flows out from the second end surface 12*b* (or the first end surface 12*a*) of the heater element 100. The component to be removed from the vehicle compartment is removed by, for instance, being adsorbed by the functional material while passing through the heater element 100. The clean air flowing out from the second end surface 12*b* (or the first end surface 12*a*) of the heater element 100 is returned to the vehicle compartment through the first path 500*a* of the outflow piping 500.

The controller 900 may end the purification mode when a predetermined condition is satisfied. The predetermined conditions include, for example, a condition that the concentration sensor signal of the component to be removed becomes under or exceeds a certain value. The controller 900 may turn off the ventilator 610 to end the purification mode (S102). At this time, the voltage applied to the heater element 100 may remain off, and it is not necessary to operate the switching valve 300.

In the regeneration mode, the controller 900 turns on the voltage applied from the power supply 200 to the heater element 100, and switches the switching valve 300 such that the air flowing through the outflow piping 500 passes through the second path 500*b*. The ventilator can be either on or off, but can be selected as appropriate depending on what regeneration mode is to be executed.

Specifically, the air from the vehicle compartment passes through the inflow piping 400 and flows in from the first end surface 12*a* (or the second end surface 12*b*) of the heater element 100, passing through the inside of the heater element 100. Then, it flows out from the second end surface 12*b* (first end surface 12*a*) of the heater element 100. The heater element 100 generates heat when energized, whereby the functional material carried on the heater element 100 is heated, so that the component to be removed captured by the functional material is desorbed from with the functional material or reacts. The component to be removed desorbed from the functional material-containing layer 20 is discharged to the outside of the vehicle through the second path 500*b* of the outflow piping 500.

In order to promote the desorption of the components to be removed captured by the functional material, it is preferable to heat the functional material to a temperature equal to or higher than the desorption temperature depending on the type of the functional material. For example, when an adsorbent is used as the functional material, it is preferable to heat at least a part, preferably the whole of the functional material to 70 to 150° C., more preferably 80 to 140° C., and even more preferably 90 to 130° C. Further, it is desirable that the regeneration mode is performed for a time until the functional material is sufficiently regenerated. Although it depends on the type of the functional material, for example, when an adsorbent is used as the functional material, in the second mode, the functional material is preferably heated in the above temperature range for 1 to 10 minutes, more preferably for 2 to 8 minutes, and even more preferably for 3 to 6 minutes.

The air from the vehicle compartment flows out from the second end surface 12*b* (or the first end surface 12*a*) of the heater element 100, entraining the component to be removed that has been desorbed from the functional material when passing through the heater element 100. The air containing the component to be removed that has flowed out from the second end surface 12*b* (or the first end surface 12*a*) of the heater element 100 is discharged to the outside of the vehicle through the second path 500*b* of the outflow piping 500.

The controller 900 is capable of executing the switching between the purification mode and the regeneration mode. Therefore, the controller 900 may be configured such that, for example, the purification mode and the regeneration mode can be alternately executed. By repeating the switching between the purification mode and the regeneration mode in a predetermined cycle, it becomes possible to stably discharge the component to be removed in the vehicle compartment to the outside of the vehicle.

Switching of the applied voltage to the heater element 100 between on and off may be performed by, for example, electrically connecting the power supply 200 and the heater element 100 with an electric wire 810, and operating a power switch 910 provided on the way. The controller 900 can execute the operation of the power switch 910. Further, it is also possible to electrically connect the controller 900 and the power supply 200 with an electric wire 860, and it is possible to change the applied voltage applied from the power supply 200 to the heater element 100 by the controller 900.

Switching of the ventilator 610 between on and off may be performed by, for example, electrically connecting the controller 900 and the ventilator 610 with an electric wire 820 or wirelessly, and operating the ventilator 610 by the controller 900.

Switching of the switching valve 300 may be performed by, for example, electrically connecting the controller 900 and the switching valve 300 by an electric wire 830 or wirelessly, and operating the switching valve 300 by the controller 900.

The switching valve 300 is not particularly limited as long as it is a valve that is electrically driven and has a function of switching the flow paths, and examples thereof include an electromagnetic valve and an electric valve. In one embodiment, the switching valve 300 comprises an open/close door 312 supported by a rotary shaft 310, and an actuator 314 such as a motor that rotates the rotary shaft 310. The actuator 314 is configured to be controllable by the controller 900.

In the regeneration mode, provided that the direction from the first end surface 12*a* to the second end surface 12*b* is a positive direction, there is a first regeneration step in which the air is flowed through the plurality of cells 13 at a flow velocity A for a predetermined time from a start of the regeneration mode, and after the first regeneration step, there is a second regeneration step in which the air from the inflow piping 400 is flowed through the plurality of cells 13 at a flow velocity B and flows out to the outflow piping 500. In both the first regeneration step and the second regeneration step, the voltage applied from the power supply 200 to the heater element 100 is turned on, and the functional material is regenerated in both steps. The controller 900 is capable of executing the regeneration mode such that the flow velocity of the air flowing through the plurality of cells 13 satisfies the flow velocity A<the flow velocity B, where the flow velocity B is a positive value. In a single operation of regeneration mode, the first regeneration step and the second regeneration step may be executed once, or may be repeated twice or more, respectively.

By executing the regeneration mode such that "the flow velocity A<the flow velocity B", the functional material carried on a portion that is difficult to be heated in the second regeneration step is heated more easily in the first regeneration step. Alternatively, the functional material carried on a portion that is difficult to be heated in the first regeneration step is heated more easily in the second regeneration step. As a result, a phenomenon that the regeneration efficiency of the functional material carried on the heater element 100 is locally reduced is suppressed. In other words, the regeneration efficiency of the functional material carried on the heater element 100 is improved as a whole. For “the flow velocity A<the flow velocity B”, there are cases where both the flow velocity A and the flow velocity B are positive values, where the flow velocity A is 0 and the flow velocity B is a positive value, and where the flow velocity A is a negative value and the flow velocity B is a positive value.

In order to monitor the temperature of the functional material carried on the heater element 100, one or more temperature sensors 930 may be installed in the heater element 100. It is also possible to electrically connect the controller 900 and the temperature sensor 930 by electric wire 850 or wirelessly, and configure the controller 900 to monitor the temperature value measured by the temperature sensor 930. Furthermore, it is possible to configure the controller 900 to feedback control the operation of the power switch 910 and/or the voltage applied to the heater element 100 based on the temperature value measured by the temperature sensor 930.

The method of changing the flow velocity of the air flowing in the cells 13 by the controller 900 during the regeneration mode is not particularly limited, and examples thereof include the following methods:

(1) A method of changing the ventilation amount of the ventilator 610 by the controller 900.

(2) A method of installing a damper 620 in the inflow piping 400 or the outflow piping 500 and controlling the damper 620 by the controller 900.

(3) A method of reversing the direction of air passing through the cells 13 of the heater element 100 by the controller 900.

In the method (1), the ventilation amount of the ventilator 610 can be changed by, for example, changing the motor rotation speed of the ventilator 610 via an inverter or the like by a command from the controller 900. When the ventilation amount of the ventilator 610 changes, the flow velocity of the air flowing in the plurality of cells 13 changes. One or more current meters 920 may be installed upstream and/or downstream of the heater element 100 to monitor the ventilation amount. Further, it is also possible to electrically connect the controller 900 and the current meter 920 by an electric wire 840 or wirelessly, and the control unit 900 may feedback control the ventilation amount of the ventilator 610 based on the value of the current meter 920.

In the method (2), a motor damper is exemplified as a suitable damper 620. By changing the opening degree of the valve of the damper 620 by the command from the controller 900, the flow velocity of the air flowing in the plurality of cells 13 changes. One or more current meters 920 may be installed upstream and/or downstream of the heater element 100 to monitor the ventilation amount. Further, it is also possible to electrically connect the controller 900 and the current meter 920 by an electric wire 840 or wirelessly, and the control unit 900 may feedback control the opening degree of the valve of the damper 620 based on the value of the current meter 920.

In the method (3), as examples of methods of reversing the direction when the air passes through the plurality of cells 13 of the heater element 100, a method that includes operating a reversible ventilator 610 capable of reversing the air direction by a command from the controller 900, and a method that includes installing a plurality of ventilators whose ventilation directions are opposite to each other and switching the ventilator to be operated by a command from the controller. Further, a method of installing a valve switching system between the outlet of the inflow piping and the inlet of the outflow piping, which will be described later, can also be mentioned.

In a preferable example in carrying out the methods (1) and (2), the controller 900 is capable of executing the regeneration mode such that the flow velocity of the air flowing through the plurality of cells 13 satisfies 2×the flow velocity A≤the flow velocity B. For example, the controller 900 controls the operating conditions (for example, motor rotation speed) of the ventilator 610 such that a predetermined flow velocity A (positive value) is obtained in the first regeneration step, and the air is flowed through the plurality of cells at the flow velocity A. Since the flow velocity A is small, it is possible to suppress a temperature drop in the vicinity of the air inlet of the heater element 100, and the heat generation uniformity is improved. Therefore, the functional material supported on the heater element 100 is also heated overall, and the uniformity when the component to be removed is desorbed from the functional material is improved. From the viewpoint of uniformly heating the functional material, the flow velocity A is preferably 0 to 0.05 m/s, and more preferably 0 to 0.02 m/s. The first regeneration step is preferably performed for 0.1 to 10 minutes, more preferably 0.2 to 8 minutes, and even more preferably 1 to 6 minutes.

Then, the controller 900 controls the operating conditions (for example, motor rotation speed) of the ventilator 610 such that a flow velocity B (positive value) larger than the flow velocity A is obtained in the second regeneration step, and the air is flowed through the plurality of cells at the flow velocity B. The flow velocity B is preferably twice or more, more preferably three times or more, and even more preferably five times or more as large as the flow velocity A. Since the flow velocity B is large, the component to be removed desorbed from the functional material in the first regeneration step is accompanied by the air flowing in the plurality of cells 13 at the flow velocity B in the second regeneration step, and the discharge from the heater element 100 is promoted. There is no particular upper limit to the flow velocity B, but from the viewpoint of suppressing pressure loss, the flow velocity B is more preferably 50 times or less, still more preferably 20 times or less as large as the flow velocity A. The second regeneration step is preferably performed for 0.1 to 10 minutes, more preferably 0.2 to 8 minutes, and even more preferably 0.2 to 5 minutes.

In another preferred example of implementing the method (1), the controller 900 can turn off the ventilator 610 in the first regeneration step. If the heater element 100 is disposed in the vehicle such that the direction from the first end surface **12*a* to the second end surface 12*b* is horizontal, when the ventilator 610 is turned off, the flow velocity A can be substantially reduced to zero. Further, if the heater element 100 is arranged in the vehicle such that the direction from the first end surface 12*a* to the second end surface 12*b* is parallel to the vertical direction, when the ventilator 610 is turned off, a slight flow velocity A is given only by natural convection. In either case, if a voltage is applied to the heater element 100 with the ventilator 610 turned off in the first regeneration step, the entire area of the heater element 100 tends to generate heat uniformly. Therefore, the functional material carried on the heater element 100** is also heated generally, and the component to be removed is easily desorbed from the functional material without bias.

After that, the controller 900 can turn on the ventilator 610 in the second regeneration step. The component to be removed desorbed from the functional material in the first regeneration step is accompanied by the air flowing in the plurality of cells 13 at the flow velocity B and is flowed out from the heater element 100 in the second regeneration step. From the viewpoint of rapidly flowing out the component to be removed desorbed from the functional material, the flow velocity B is preferably 0.03 m/s or more, and more preferably 0.05 m/s or more. Although there is no particular upper limit to the flow velocity B, it is preferably 2 m/s or less, and more preferably 1 m/s or less, from the viewpoint of suppressing pressure loss and power suppression of the ventilator 610. The second regeneration step is preferably performed for 0.1 to 10 minutes, more preferably 0.2 to 8 minutes, and even more preferably 0.2 to 5 minutes.

When the method (3) is carried out, from the viewpoint of preventing the component to be removed desorbed from the functional material from staying in the heater element 100 and allowing it to flow out quickly, the absolute value of the flow velocity A in the first regeneration step is preferably 0.01 m/s or more, and more preferably 0.02 m/s or more. There is no particular upper limit to the flow velocity A, but from the viewpoint of rapidly raising the temperature of the heater element 100, the absolute value is preferably 0.05 m/s or less, and the absolute value is more preferably 0.03 m/s or less. The first regeneration step is preferably performed for 0.01 to 0.1 minutes, more preferably 0.01 to 0.2 minutes, and even more preferably 0.02 to 0.2 minutes.

When the method (3) is carried out, from the viewpoint of preventing the component to be removed desorbed from the functional material from staying in the heater element 100 and allowing it to flow out quickly, the absolute value of the flow velocity B in the second regeneration step is preferably value of 0.05 m/s or more, and more preferably 0.08 m/s or more. There is no particular upper limit to the flow velocity B, but from the viewpoint of reducing pressure loss and reducing the power of the ventilator 610, the absolute value is preferably 0.2 m/s or less, and more preferably 0.15 m/s or less. preferable. The second regeneration step is preferably performed for 0.1 to 10 minutes, more preferably 0.1 to 8 minutes, and even more preferably 0.2 to 5 minutes.

When the regeneration mode is carried out, the flow velocity A and the flow velocity B of the air flowing through the cells 13 of the heater element 100 may or may not be monitored. When monitoring, it can be calculated based on, for example, the value of the current meter 920, the cross-sectional area of the inflow piping 400 or the outflow piping 500, and the opening area of the cells 13. The calculation may be performed by the controller 900, and the vehicle compartment purification system 1000 may be configured to be capable of feedback controlling the ventilator 610 and/or the damper 620 by the controller 900 such that the desired flow velocity A and flow velocity B can be obtained based on the calculation result.

Figure 5A:
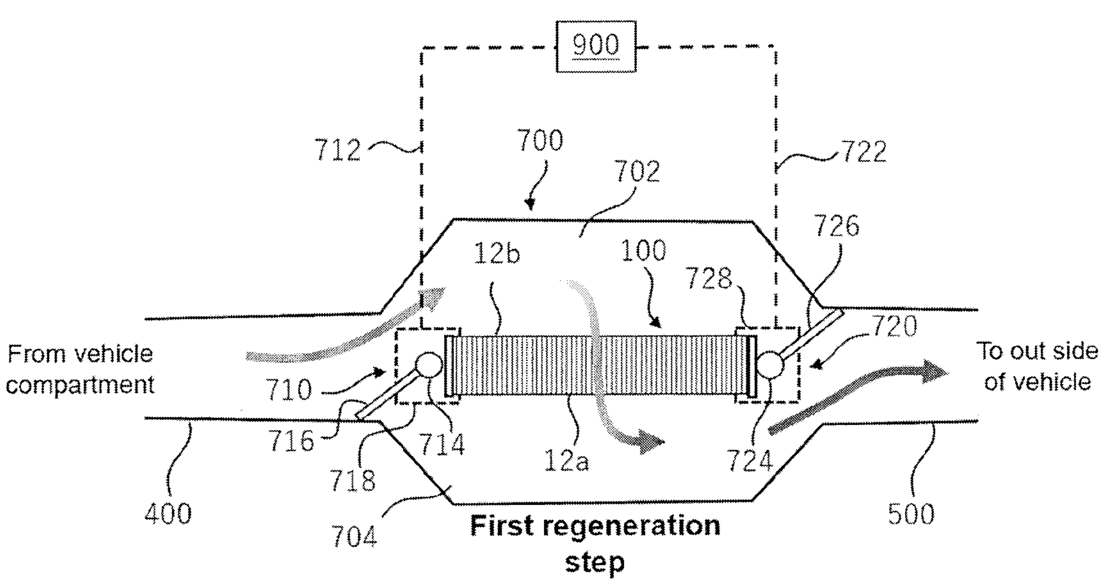
FIG. 5A is a schematic diagram showing a valve position in a first regeneration step in a valve switching system according to an embodiment of the present invention.
Figure 5B:
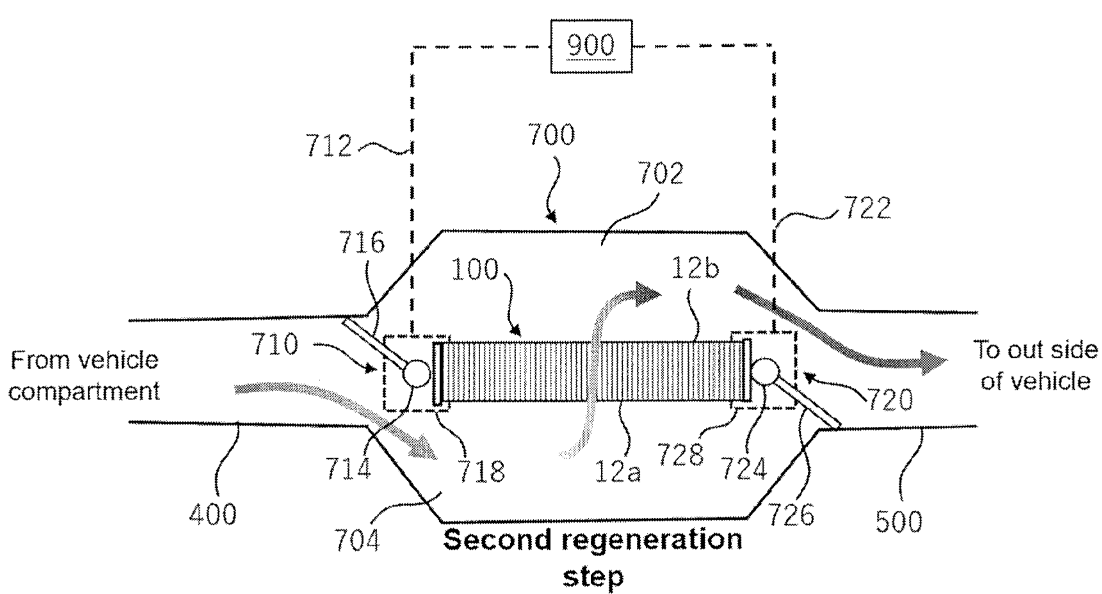
FIG. 5B is a schematic diagram showing a valve position in a second regeneration step in a valve switching system according an the embodiment of the present invention.

Hereinafter, a valve switching system that enables preferred implementations of the method (3) will be described in detail. FIGS. 5A and 5B show a configuration example of a valve switching system according to an embodiment of the present invention. Further, FIG. 5A shows the valve position when the first regeneration step is carried out using the valve switching system according to the present embodiment, and FIG. 5B shows the valve position when the second regeneration step is carried out using the valve switching system according to the present embodiment, respectively.

The valve switching system according to this embodiment further comprises:

- a chamber 700 provided between an outlet of the inflow piping 400 and an inlet of the outflow piping 500 and accommodating the heater element 100;
- a chamber inlet valve 710 provided on an inlet side of the chamber 700 and can be switched between a mode in which an inflow of the air sent from the vehicle compartment through the inflow piping 400 to the first end surface 12*a* is allowed and the inflow to the second end surface 12*b* is suppressed, and a mode in which the inflow to the second end surface 12*b* is allowed and the inflow to the first end surface 12*a* is suppressed;
- a chamber outlet valve 720 provided on an outlet side of the chamber 700 and can be switched between a mode in which an inflow of the air flowing out from the second end surface 12*b* to the outflow piping 500 is allowed and the inflow to the first end surface 12*a* is suppressed, and a mode in which an inflow of the air flowing out from the first end surface 12*a* to the outflow piping 500 is allowed and the inflow to the second end surface 12*b* is suppressed.

The first regeneration step comprises:

- controlling the chamber inlet valve 710 by the controller 900 so as to allow the inflow to the second end surface 12*b* and suppress the inflow to the first end surface 12*a*, and
- controlling the chamber outlet valve 720 by the controller 900 so as to allow the inflow of the air flowing out from the first end surface 12*a* to the outflow piping 500 and suppress the inflow to the second end surface 12*b*.

In the first regeneration step, controlling the chamber outlet valve 720 by the controller 900 so as to allow the inflow of the air flowing out from the first end surface 12*a* to the outflow piping 500 and suppress the inflow to the second end surface 12*b*, also helps to suppress a bypass phenomenon in which the air that has passed through the inflow piping 400 and flowed into the space 702 on the side of the second end surface 12*b* in the chamber 700 flows out to the outflow piping 500 without flowing through the cells 13 of the heater element 100.

The second regeneration step comprises:

- controlling the chamber inlet valve 710 by the controller 900 so as to allow the inflow to the first end surface 12*a* and suppress the inflow to the second end surface 12*b*, and
- controlling the chamber outlet valve 720 by the controller 900 so as to allow the inflow of the air flowing out from the second end surface 12*b* to the outflow piping 500 and suppress the inflow to the first end surface 12*a*.

In the second regeneration step, controlling the chamber outlet valve 720 by the controller 900 so as to allow the inflow of the air flowing out from the second end surface 12*b* to the outflow piping 500 and suppress the inflow to the first end surface 12*a*, also helps to suppress a bypass phenomenon in which the air that has passed through the inflow piping 400 and flowed into the space 704 on the side of the first end surface 12*a* in the chamber 700 flows out to the outflow piping 500 without flowing through the cells 13 of the heater element 100.

Switching of the flow paths by the chamber inlet valve 710 is possible, for example, by electrically connecting the controller 900 and the chamber inlet valve 710 with an electric wire 712 or wirelessly, and operating the chamber inlet valve 710 by the controller 900. Similarly, switching of the flow paths by the chamber outlet valve 720 is possible by, for example, electrically connecting the controller 900 and the chamber outlet valve 720 by an electric wire 722 or wirelessly, and operating the chamber outlet valve 720 by the controller.

The chamber inlet valve 710 and the chamber outlet valve 720 are not particularly limited as long as they are electrically driven and have a function of switching the flow paths, and examples thereof include an electromagnetic valve and an electric valve. In one embodiment, the chamber inlet valve 710 comprises an open/close door 716 supported by a rotary shaft 714, and an actuator 718 such as a motor that rotates the rotary shaft 714. The actuator 718 is configured to be controllable by the controller 900. Similarly, in one embodiment, the chamber outlet valve 720 comprises an open/close door 726 supported by a rotary shaft 724, and an actuator 728 such as a motor that rotates the rotary shaft 724. The actuator 728 is configured to be controllable by the controller 900.

In the first regeneration step, when the air sent from the vehicle compartment through the inflow piping 400 flows into the space 702 on the side of the second end surface 12*b* in the chamber 700, the air passes through the heater element 100 from the second end surface 12*b* toward the first end surface 12*a* (flow velocity A is a negative value). Accordingly, when the heater element 100 generates heat, the temperature rises from the second end surface 12*b* on the air inflow side toward the first end surface 12*a* on the air outflow side. Therefore, the regeneration efficiency of the functional material is higher as it is closer to the first end surface 12*a* and lower as it is closer to the second end surface 12*b*.

On the other hand, in the second regeneration step, when the air sent from the vehicle compartment through the inflow piping 400 flows into the space 704 on the first end surface 12*a* side in the chamber 700, the air passes through the heater element 100 from the first end surface 12*a* toward the second end surface 12*b* (the flow velocity B is a positive value). Accordingly, when the heater element 100 generates heat, the temperature tends to rise toward the second end surface 12*b* which is now converted to the outflow side of the air, and the regeneration efficiency of the functional material near the second end surface 12*b*, which was low in the first regeneration step, increases.

As described above, by sequentially carrying out the first regeneration step and the second regeneration step, the functional material in the functional material-containing layer carried on the heater element 100 can be exposed to a sufficiently high temperature at least once. As a result, the places where the functional material is locally insufficiently regenerated can be reduced, and the regeneration efficiency of the functional material can be improved as a whole. The first regeneration step and the second regeneration step may be executed once, or may be repeated twice or more, respectively.

The valve switching system described above can be effectively used not only in the regeneration mode but also in the purification mode. In this case, the purification mode includes a first purification step and a second purification step.

The first purification step comprises:

controlling the chamber inlet valve 710 by the controller 900 so as to allow the inflow to the second end surface 12*b* and suppress the inflow to the first end surface 12*a*, and controlling the chamber outlet valve 720 by the controller 900 so as to allow the inflow of the air flowing out from the first end surface 12*a* to the outflow piping 500 and suppress the inflow to the second end surface 12*b*.

The second purification step comprises:

controlling the chamber inlet valve 710 by the controller 900 so as to allow the inflow to the first end surface 12*a* and suppress the inflow to the second end surface 12*b*, and controlling the chamber outlet valve 720 by the controller 900 so as to allow the inflow of the air flowing out from the second end surface 12*b* to the outflow piping 500 and suppress the inflow to the first end surface 12*a*.

When the air containing the component to be removed passes through the heater element 100 in one direction, the load on the inflow side of the functional material carried on the heater element 100 is heavier, while the load on the outflow side becomes light. However, between the first purification step and the second purification step, the flow of air flowing through the heater element 100 is opposite to each other. As a result, the operation conditions of the functional material carried on the heater element 100 are reversed during the purification mode, so that the functional material can be used efficiently without bias. The overall removal efficiency of the component to be removed is also improved.

Figure 7:
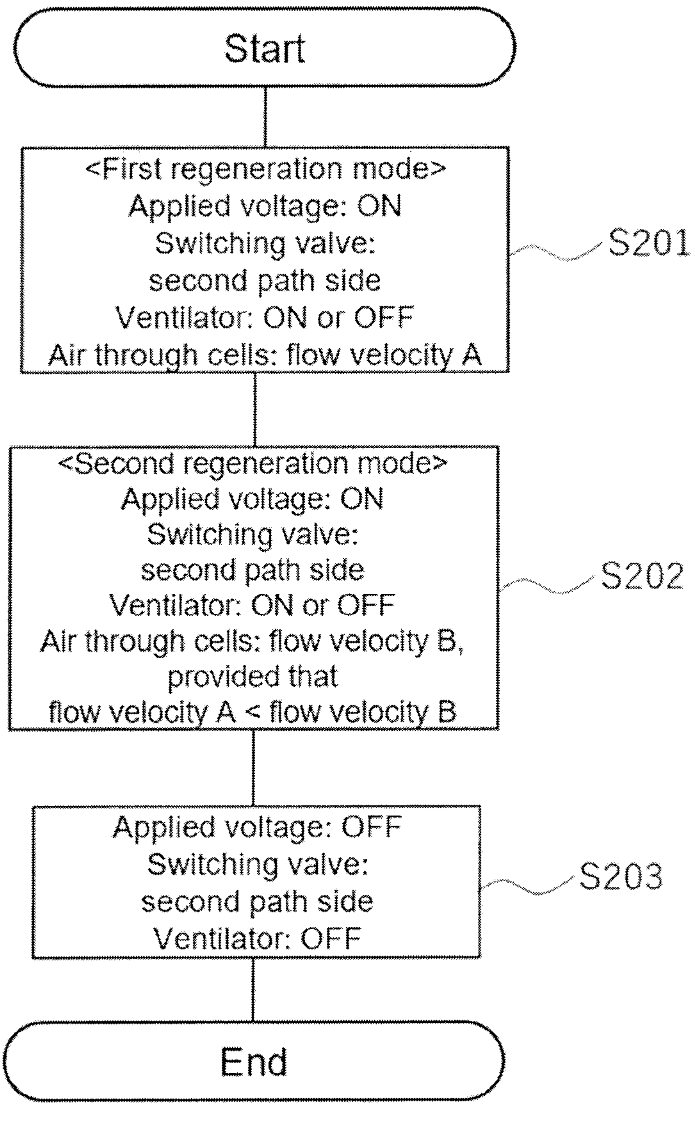
FIG. 7 is an example of a flowchart when a controller 900 executes a regeneration mode.

FIG. 7 shows an example of a flowchart when the controller 900 executes the regeneration mode. For example, when the controller 900 receives a regeneration mode start command triggered by a concentration sensor signal of the component to be removed (for water vapor, humidity sensor signal or the like) from a concentration sensor 940 installed in the outflow piping 500 and electrically connected to the controller 900 by an electric wire 870 or wirelessly, or an elapse of a predetermined time, the controller 900 turns on the voltage applied to the heater element 100, and switches the switching valve 300 such that the air flowing through the outflow piping 500 passes through the second path 500*b*. The ventilator 610 may be on or off depending on the execution method of the first regeneration step, which is appropriately selected (S201). As a result, the first regeneration step is started, and a part of the component to be removed captured by the functional material is desorbed from the functional material. The component to be removed desorbed from the functional material-containing layer 20 is discharged to the outside of the vehicle through the second path 500*b* of the outflow piping 500.

Then, when a predetermined condition is satisfied, the controller 900 shifts from the first regeneration step to the second regeneration step. The predetermined conditions include, for example, that the temperature of the heater element 100, the outlet air temperature of the heater element 100, or the like exceeds a predetermined temperature (for example, 90° C.). Assuming that the flow velocity of the air flowing through the plurality of cells 13 in the first regeneration step is the flow velocity A and the flow velocity of the air flowing through the plurality of cells 13 in the second regeneration step is the flow velocity B, the controller 900 changes the ventilation amount of the ventilator 610 such that the flow velocity A<the flow velocity B is satisfied in order to shift to the second regeneration step (S202). According to the method of changing the ventilation amount, the ventilator 610 may be on or off depending on the execution method of the first regeneration step, which is appropriately selected. In the second regeneration step, the voltage applied from the power supply 200 remains on, and it is not necessary to operate the switching valve 300. In the second regeneration step, it is possible to increase the regeneration efficiency of the functional material whose regeneration was insufficient in the first regeneration step.

The controller 900 may end the second regeneration step when a predetermined condition is satisfied (S203). The predetermined conditions include, for example, that a predetermined duration of the second regeneration step has elapsed, or that the concentration of the component to be removed at the outlet of the heater element 100 has reached a predetermined value or less. The controller 900 may turn off the voltage applied to the heater element 100 and turn off the ventilator 610 in order to end the second regeneration step. It is not necessary to operate the switching valve 300.

In the vehicle compartment purification system 1000, it is desirable that the heater element 100 be arranged at a position close to the vehicle compartment from the viewpoint of stably ensuring the above functions. Therefore, from the viewpoint of preventing electric shock, etc., the drive voltage is preferably 60 V or less. Since the honeycomb structure 10 used in the heater element 100 has a low electrical resistance at room temperature, the honeycomb structure 10 can be heated with this low driving voltage. In addition, the lower limit of the drive voltage is not particularly limited, but is preferably 10 V or more. If the drive voltage is less than 10 V, the electric current at the time of heating the honeycomb structure 10 becomes large, so that it is necessary to make the electric wire 810 thick.

In addition, in the embodiment shown in FIG. 4, the ventilator 610 is installed on the upstream side of the heater element 100. More specifically, the ventilator 610 is installed on the way of the inflow piping 400 that communicates the heater element 100 and the vehicle compartment, and the air that has passed through the ventilator 610 is pushed to flow into the heater element 100. Alternatively, the ventilator 610 may be installed downstream of the heater element 100. In this case, the ventilator 610 can be installed on the way of the outflow piping 500, for example, and the air that has passed through the inflow piping 400 is sucked to flow into the heater element 100.

The function of the controller 900 described above can be realized by a hardware mainly composed of a digital circuit or an analog circuit. Further, the function can be realized by a CPU (Central Processing Unit) and a memory, and a software mainly composed of a program that is read out from the memory and executed by the CPU. Therefore, according to one embodiment of the present invention, there is provided a program for causing a computer to execute a method for controlling a vehicle compartment purification system according to the present invention. This program can be stored on a computer-readable storage medium. In this case, the program itself read out from the storage medium realizes the above-mentioned control method, and the storage medium storing the program constitutes one embodiment of the present invention.

Examples of the storage medium for storing the program include flexible disks, hard disks, optical disks, magneto-optical disks, CD-ROMs, CD-Rs, DVDs, non-volatile memory cards, ROMs, and the like. Further, this program may be distributed from one computer to another computer via a transmission medium (communication network such as WAN or LAN), or may be stored in a cloud.

EXAMPLES

The temperature changes of the first end surface and the second end surface of a heater element over time when heat was generated while flowing the air from the first end surface (inlet) to the second end surface (outlet) of the heater element were measured experimentally, and the results are shown.

<Specifications of Heater Element>

The design specifications of the heater element used in the test are as follows.

[Honeycomb Heater Device]

- Cross-section and end surface shape of the honeycomb structure orthogonal to the flow path direction: quadrangle
- Cell shape orthogonal to the flow path: Square
- Thickness of the outer peripheral wall: 0.5 mm
- Thickness of the partition walls: 0.13 mm
- Cell density: 80 cells/cm$^2$
- Cell pitch: 1.1 mm
- Cell opening ratio: 0.85
- Size of cross-section orthogonal to the flow path direction of the honeycomb structure: 100 mm×115 mm
- Length of the honeycomb structure in the flow path direction: 10 mm
- Volume resistivity of the material constituting the outer peripheral wall and the partition walls at 25° C.: 15 Ω·cm
- Materials constituting the outer peripheral wall and the partition walls: barium titanate (Curie point: 120° C.)
- Electrode position: Formed with a predetermined thickness so as to cover the entire surface of the first end surface and the second end surface
- Electrode thickness: 0.01 mm
- Volume resistivity of the electrode at 25° C.: 1 Ω·cm
- Electrode material: Al—Ni alloy

[Functional Material-Containing Layer]

The above honeycomb heater device was immersed in a slurry containing zeolite (functional material), an organic binder and water, and the excessive slurry on the end surfaces and the outer periphery was removed by blowing and wiping, and then dried at a temperature of about 550° C. to form a functional material-containing layer on the partition walls. Other design specifications for the functional material-containing layer are as follows.

- Average thickness of the functional material-containing layer: 0.2 mm
- Amount of functional material-containing layer with respect to the volume of the honeycomb structure: 30 g/L
- Forming portions of the functional material-containing layer: the entire inner walls of the cells (the entire surface of the partition walls and the outer peripheral wall facing the cells)

[Heating Test]

Example

Figure 8:
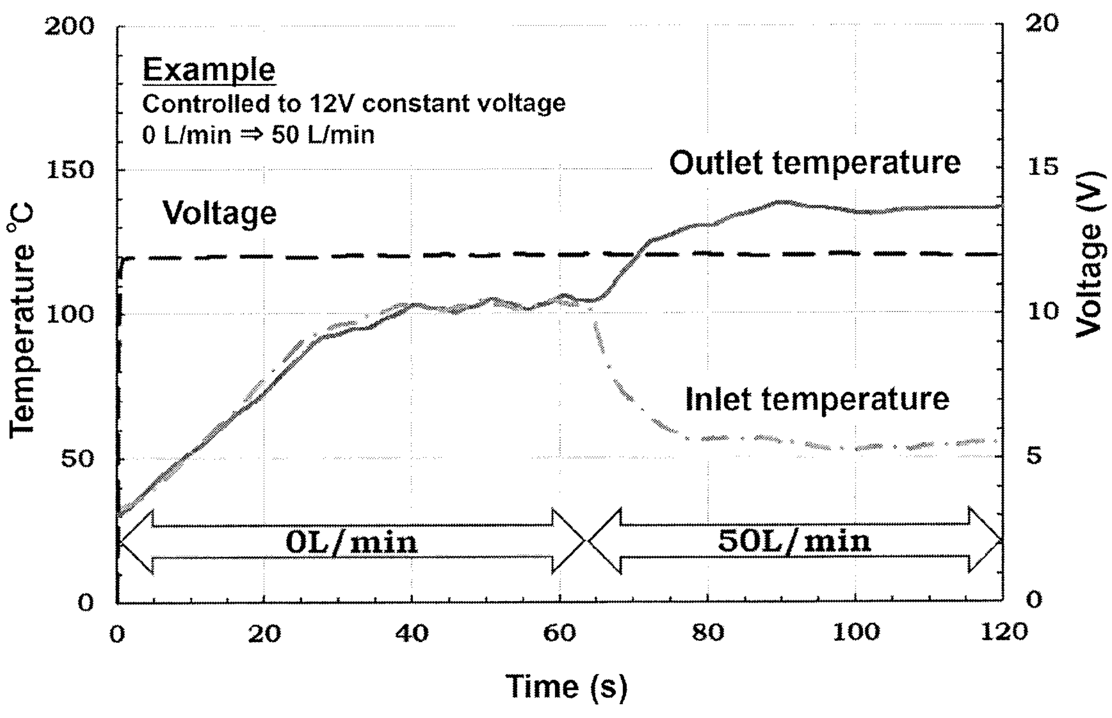
FIG. 8 is a graph showing changes over time in the inlet temperature and the outlet temperature in the Example.

While applying a constant voltage of 12V to the heater element via the pair of electrodes, a heat generation test was conducted to investigate the temperature changes of the first end surface and the second end surface when the air (initial temperature=25° C.) was flowed through the cells of the heater element from the first end surface (inlet) to the second end surface (outlet). No air was flowed in the cells for 65 seconds from the start of voltage application (flow velocity A=0). Then, the air was flowed through the cells at 50 L/min (0.052 m/s when converted to the flow velocity of the air flowing through each cell=flow velocity B). The result for 120 seconds from the start of voltage application is shown in FIG. 8. As shown in FIG. 8, in a state where the air was not flowed, after 15 seconds, both the first end surface (inlet) and the second end surface (outlet) exceeded 60° C. at which regeneration of the functional material was promoted, and after 40 seconds, the temperature exceeded 100° C. at which the functional material became active. After that, when 50 L/min of the air was flowed through the cells, the first end surface on the inlet side was cooled by the air of room temperature and the temperature dropped to about 50° C.

Comparative Example

Figure 9:
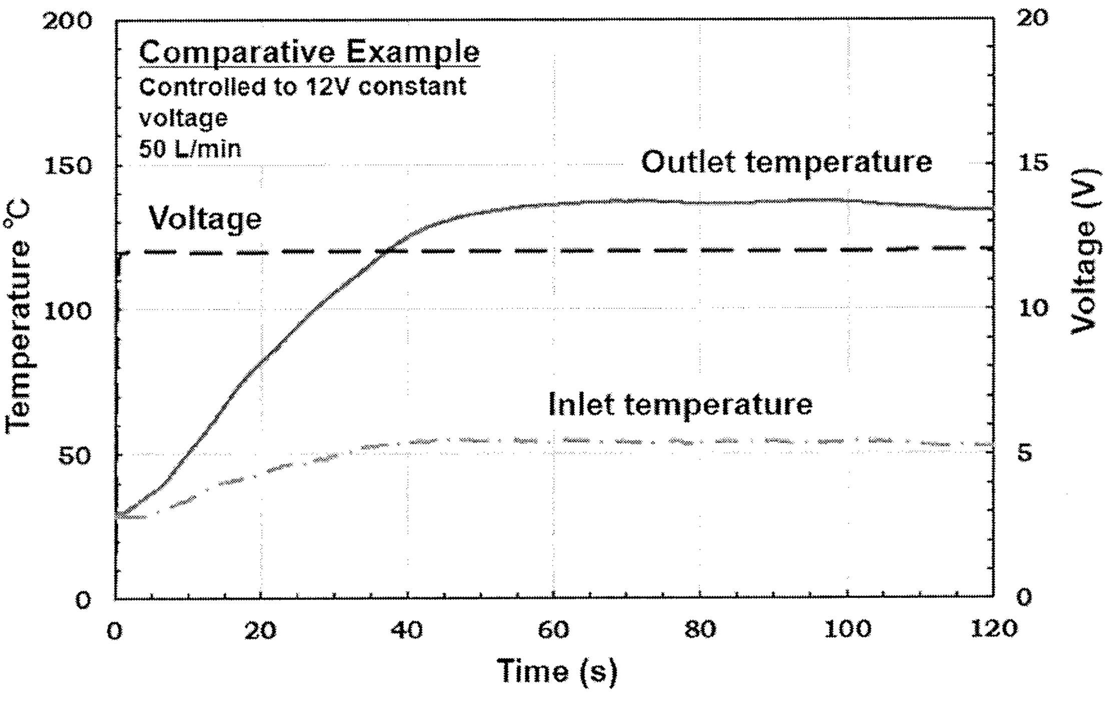
FIG. 9 is a graph showing changes over time in the inlet temperature and the outlet temperature in the Comparative Example.

The heat generation test was performed under the same conditions as in Example except that 50 L/min of the air was flowed through the cells from the start of voltage application. The results are shown in FIG. 9. As shown in FIG. 9, the second end surface on the outlet side exceeded 100° C. after 30 seconds, but the first end surface on the inlet side was cooled by the air of room temperature, so that the temperature could not exceed 60° C. over time.

DESCRIPTION OF REFERENCE NUMERALS

10: Honeycomb structure
11: Outer peripheral wall
12*a*: First end surface
12*b*: Second end face
13: Cell
14: Partition wall
20: Functional material-containing layer
30*a*: Electrode
30*b*: Electrode
100: Heater element
200: Power supply
300: Switching valve
310: Rotating shaft
312: Open/close door
314: Actuator
400: Inflow piping
500: Outflow piping
500*a*: First path
500*b*: Second path
610: Ventilator
620: Damper
700: Chamber
702: Space
704: Space
710: Chamber inlet valve
712: Electric wire
714: Rotating shaft
716: Open/close door
718: Actuator
720: Chamber outlet valve
722: Electric wire
724: Rotating shaft
726: Open/close door
728: Actuator
810: Electric wire
820: Electric wire
830: Electric wire
840: Electric wire
850: Electric wire
860: Electric wire
870: Electric wire
900: Control unit
910: Power switch
920: Current meter
930: Temperature sensor
940: Concentration sensor
1000: Vehicle compartment purification system

The invention claimed is:

1. A vehicle compartment purification system, comprising:

a heater element comprising a honeycomb structure and a functional material-containing layer, wherein the honeycomb structure has an outer peripheral wall and partition walls provided inside the outer peripheral wall, the partition walls partitioning a plurality of cells that form flow paths extending from an first end surface to an second end surface, and at least the partition walls are made of a material having PTC characteristics, and the functional material-containing layer is provided on a surface of the partition walls;

a power supply for applying voltage to the heater element;

an inflow piping for sending air from the vehicle compartment to the plurality of cells of the heater element;

an outflow piping comprising a first path for returning the air flowing out of the plurality of cells of the heater element to the vehicle compartment, and a second path for discharging the air flowing out of the plurality of cells of the heater element to an outside of the vehicle;

a switching valve provided in the outflow piping and capable of switching the flow of the air flowing through the outflow piping between the first path and the second path;

a ventilator for sending the air from the vehicle compartment to the heater element via the inflow piping; and a controller configured to execute a regeneration mode in which a component to be removed is captured by the functional material-containing layer is discharged to the outside of the vehicle by turning on an voltage applied from the power supply, and switching the switching valve such that the air flowing through the outflow piping passes through the second path;

wherein the regeneration mode comprises:

a first regeneration step in which the air is flowed through the plurality of cells at a flow velocity A for a predetermined time from a start of the regeneration mode, and after the first regeneration step, a second regeneration step in which the air from the inflow piping is flowed through the plurality of cells at a flow velocity B and flowed out to the outflow piping; and the vehicle compartment purification system is configured to execute the regeneration mode by the controller such that the flow velocity A and the flow velocity B satisfy the flow velocity A<the flow velocity B, provided that a direction from the first end surface to the second end surface is regarded as a positive direction, and the flow velocity B is a positive value.

2. The vehicle compartment purification system according to claim 1, wherein during the first regeneration step the ventilator is turned off by the controller.

3. The vehicle compartment purification system according to claim 2, wherein the heater element is arranged in the vehicle such that the direction from the first end surface to the second end surface is parallel to a vertical direction.

4. The vehicle compartment purification system according to claim 1, wherein during the regeneration mode by the controller, the flow velocity of the air flowing through the plurality of cells satisfies 2×the flow velocity A≤the flow velocity B.

5. The vehicle compartment purification system according to claim 1, wherein during the regeneration mode by the controller, the flow velocity A is a negative value, and the flow velocity B is a positive value.

6. The vehicle compartment purification system according to claim 5, further comprising:

a chamber provided between an outlet of the inflow piping and an inlet of the outflow piping and accommodating the heater element;

a chamber inlet valve provided on an inlet side of the chamber and can be switched between a mode in which an inflow of the air sent from the vehicle compartment through the inflow piping to the first end surface is allowed and the inflow to the second end surface is suppressed, and a mode in which the inflow to the second end surface is allowed and the inflow to the first end surface is suppressed;

a chamber outlet valve provided on an outlet side of the chamber and can be switched between a mode in which an inflow of the air flowing out from the second end surface to the outflow piping is allowed and the inflow to the first end surface is suppressed, and a mode in which an inflow of the air flowing out from the first end surface to the outflow piping is allowed and the inflow to the second end surface is suppressed;

wherein the first regeneration step comprises:

controlling the chamber inlet valve by the controller so as to allow the inflow to the second end surface and suppress the inflow to the first end surface, and controlling the chamber outlet valve by the controller so as to allow the inflow of the air flowing out from the first end surface to the outflow piping and suppress the inflow to the second end surface; and the second regeneration step comprises:

controlling the chamber inlet valve by the controller so as to allow the inflow to the first end surface and suppress the inflow to the second end surface, and controlling the chamber outlet valve by the controller so as to allow the inflow of the air flowing out from the second end surface to the outflow piping and suppress the inflow to the first end surface.

7. The vehicle compartment purification system according to claim 1, wherein the controller is configured to execute a purification mode in which the component to be removed contained in the air from the vehicle compartment is captured by the functional material-containing layer by turning off the voltage applied from the power supply, and the controller switches the switching valve such that the air flowing through the outflow piping passes through the first path and turning on the ventilator.

8. The vehicle compartment purification system according to claim 1, wherein the honeycomb structure comprises a pair of electrodes on the first end surface and the second end surface.

9. A method for controlling a vehicle compartment purification system, the vehicle compartment purification system comprising:

a heater element comprising a honeycomb structure and a functional material-containing layer, wherein the honeycomb structure has an outer peripheral wall and partition walls provided inside the outer peripheral wall, the partition walls partitioning a plurality of cells that form flow paths extending from an first end surface to an second end surface, and at least the partition walls are made of a material having PTC characteristics, and the functional material-containing layer is provided on a surface of the partition walls;

a power supply for applying voltage to the heater element;

an inflow piping for sending air from the vehicle compartment to the plurality of cells of the heater element;

an outflow piping comprising a first path for returning the air flowing out of the plurality of cells of the heater element to the vehicle compartment, and a second path for discharging the air flowing out of the plurality of cells of the heater element to an outside of the vehicle;

a switching valve provided in the outflow piping and capable of switching the flow of the air flowing through the outflow piping between the first path and the second path; and a ventilator for sending the air from the vehicle compartment to the heater element via the inflow piping;

wherein the method comprises a regeneration mode in which a component to be removed captured by the functional material-containing layer is discharged to the outside of the vehicle by turning on an voltage applied from the power supply, and switching the switching valve such that the air flowing through the outflow piping passes through the second path;

the regeneration mode comprises:

a first regeneration step in which the air is flowed through the plurality of cells at a flow velocity A for a predetermined time from a start of the regeneration mode, and after the first regeneration step, a second regeneration step in which the air from the inflow piping is flowed through the plurality of cells at a flow velocity B and flowed out to the outflow piping; and the method comprises controlling the vehicle compartment purification system such that the flow velocity A and the flow velocity B satisfy the flow velocity A<the flow velocity B, provided that a direction from the first end surface to the second end surface is regarded as a positive direction, and the flow velocity B is a positive value.

10. The method for controlling a vehicle compartment purification system according to claim 9, comprising controlling the ventilator off in the first regeneration step.

11. The method for controlling a vehicle compartment purification system according to claim 9, comprising controlling the flow velocity of the air flowing through the plurality of cells such that 2×the flow velocity A≤the flow velocity B is satisfied when executing the first regeneration step and the second regeneration step.

12. The method for controlling a vehicle compartment purification system according to claim 9, comprising controlling the flow velocity of the air flowing through the plurality of cells such that the flow velocity A is a negative value and the flow velocity B is a positive value when executing the first regeneration step and the second regeneration step.

13. The method for controlling a vehicle compartment purification system according to claim 12, wherein the vehicle compartment purification system further comprises:

a chamber provided between an outlet of the inflow piping and an inlet of the outflow piping and accommodating the heater element;

a chamber inlet valve provided on an inlet side of the chamber and can be switched between a mode in which an inflow of the air sent from the vehicle compartment through the inflow piping to the first end surface is allowed and the inflow to the second end surface is suppressed, and a mode in which the inflow to the second end surface is allowed and the inflow to the first end surface is suppressed;

a chamber outlet valve provided on an outlet side of the chamber and can be switched between a mode in which an inflow of the air flowing out from the second end surface to the outflow piping is allowed and the inflow to the first end surface is suppressed, and a mode in which an inflow of the air flowing out from the first end surface to the outflow piping is allowed and the inflow to the second end surface is suppressed;

wherein the first regeneration step comprises:

controlling the chamber inlet valve so as to allow the inflow to the second end surface and suppress the inflow to the first end surface, and controlling the chamber outlet valve so as to allow the inflow of the air flowing out from the first end surface to the outflow piping and suppress the inflow to the second end surface; and the second regeneration step comprises:

controlling the chamber inlet valve so as to allow the inflow to the first end surface and suppress the inflow to the second end surface, and controlling the chamber outlet valve so as to allow the inflow of the air flowing out from the second end surface to the outflow piping and suppress the inflow to the first end surface.

14. The method for controlling a vehicle compartment purification system according to claim 9, comprising a purification mode in which the component to be removed contained in the air from the vehicle compartment is captured by the functional material-containing layer by turning off the voltage applied from the power supply, switching the switching valve such that the air flowing through the outflow piping passes through the first path and turning on the ventilator.

15. A non-transitory computer-readable storage medium storing a program for causing a computer to execute the method for controlling a vehicle compartment purification system according to claim 9.

* * * * *